Figure 1:
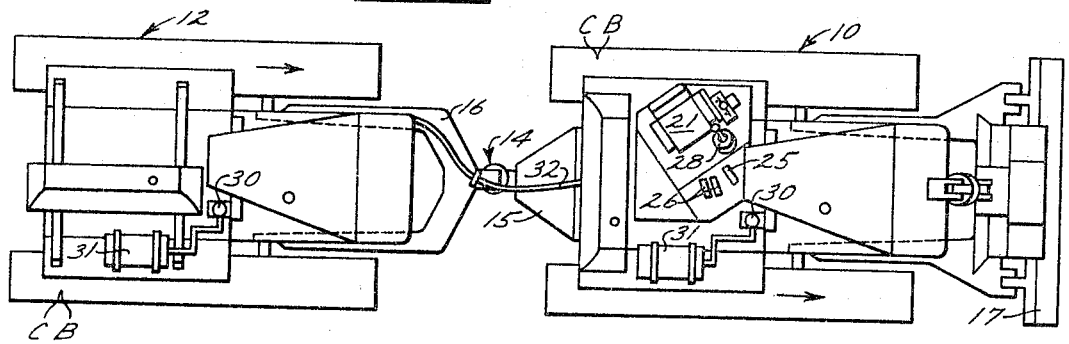

INVENTORS
DONALD H. STROOT
DONALD E. SUNDERLIN
BY
ATTORNEYS

United States Patent Office 3,324,963
Patented June 13, 1967

3,324,963
STEERING SYSTEM FOR TANDEM TRACTOR
Donald H. Stroot, San Leandro, Calif., and Donald E. Sunderlin, Washington, Ill., assignors to Caterpillar Tractor Co., Peoria, Ill., a corporation of Illinois
Filed Jan. 21, 1965, Ser. No. 426,766
1 Claim. (Cl. 180—6.2)

This invention relates to the steering of tractors which are coupled for tandem operation and particularly to the steering of the tandem track-type tractors wherein steering is accomplished by driving and braking.

In our assignee's co-pending application of Robert A. Peterson entitled, "Control Arrangement for Steering of Tractors in Tandem," filed Mar. 19, 1964, Ser. No. 353,164, now Patent No. 3,245,488 a system is described in which an operator on one or two tandem tractors can actuate the steering clutch controls and brakes on both.

Thus, as fully described in said application, the tractors are conditioned to negotiate a left turn by releasing the driving clutch and applying the brake to the left track of the forward tractor and releasing the clutch and applying the brake to the right track of the rearward tractor. The two tractors are momentarily steered in opposite directions or jackknifed until they assume an angular relation with respect to each other whereupon simple forward driving of all four tracks causes them to advance on an arcuate path.

The above described steering system employs a single valve control at the operator's station by means of which the steering clutch on either track of the forward tractor and the opposite track on the rear tractor may be simultaneously released. Brakes for the corresponding tracks were applied by either one of two brake pedals. The selecting of the proper brake pedal to coincide with clutch controls required a quick decision and failure to actuate the proper pedal quickly or operation of the wrong pedal caused faulty and slow steering and decreased efficiency.

The present invention takes advantage of the fact that braking of all tracks to retard or stop tractors in tandem is not necessary during the brief adjustment which places the two tractor units in their angularly related or turning position.

It is the object of the present invention to provide a steering system for tandem tractors of the kind described above but in which a single brake pedal is employed for simultaneous actuation of both brakes on both tractors.

A further object is to provide means to close or disable the circuit of selected brakes automatically upon actuation of the clutch control circuit to effect desired steering without requiring the operator to select one of two separate pedals.

Further and more specific objects and advantages and the manner in which the invention is carried into practice are made apparent in the following specification by reference to the accompanying drawings.

Figure 2:
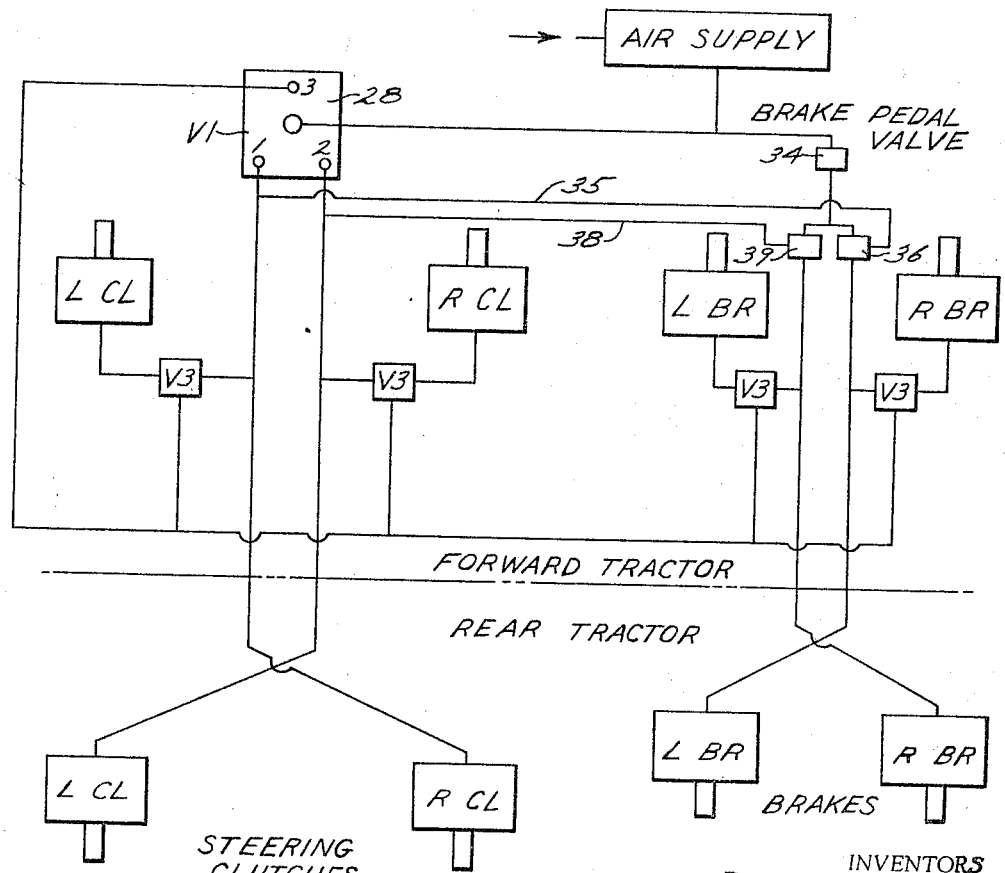

In the drawings:

FIG. 1 is a schematic plan view of two track-type tractors connected together in tandem relationship; and FIG. 2 is a schematic view of the fluid circuits employed in obtaining the method of steering of the present invention.

The two tractors schematically shown in FIG. 1 comprise a forwardly disposed tractor, generally indicated at 10, and a rearwardly disposed tractor, generally indicated at 12. These tractors are connected in tandem by a universal connection in the form of a ball and socket joint shown at 14, the ball portion of which is rigidly supported on a bracket 15 securely fixed to the final drive housing of the forward tractor. The socket portion of this connection is carried on a forward extension of a standard inside mounted C-frame 16 conventionally used in the supporting of forwardly mounted tools such as bulldozer blades and the like. The forward tractor 10 is here shown as equipped with a bulldozer blade 17 fitted for pushing operations and the rear tractor may, if desired, carry a ripper or other rear mounted tool, not shown.

A typical left turn is undertaken as is schematically shown in FIG. 1 by releasing the left clutch and applying the left brake at the position generally indicated at C-B on the forward tractor so that forward movement in the direction of the arrow of the right track tends to turn the tractor toward the left. Simultaneously, on the rearward tractor the right clutch and brake C-B are applied to permit forward movement of the left track to cause momentary right turning which effects jackknifing or angular positioning of the two tractors to establish an arc upon which they will travel when the brakes are released and the clutch is engaged in normal forward operation of both units.

In accordance with the present invention, all steering and braking of both tractors is accomplished with controls from an operator's station on the forward tractor including a seat shown at 21 in FIG. 1. The operator's station includes a brake pedal 25, a pair of accelerator pedals 26, one for the engine of each tractor, and a steering clutch control valve 28 also shown at 28 and designated VI in the schematic illustration of FIG. 2. The clutches and brakes of the tractors are engaged and disengaged through pneumatic roto chambers as is conventional practice and each of the two tractors is provided with its own source of air under pressure, schematically shown in FIG. 1 as a compressor 30 on each tractor and storage tanks 31. A bundle of hoses or flexible conduits is shown at 32 for communicating control pressure from the forward tractor to the rearward tractor, thus the valve 28 may be manipulated to effect disengagement of the steering clutches of opposite hands on the two tractors.

In the pneumatic circuit illustrated in FIG. 2 the components carried on the forward tractor are shown above the horizontal broken line and those on the rear tractor below the line. The steering clutches of both tractors are actuated by roto chambers designated R and L CL (right and left clutch) respectively and the brakes are actuated by roto chambers designated R and L BR for the right and left brakes respectively. The steering clutches and brakes, relay valves identified V3, as well as the roto chambers for actuating them, are all of conventional construction as disclosed in the forementioned application Ser. No. 353,164 and need not be described herein. The steering valve 28 is also conventional and is capable of communicating air from a source under pressure to an outlet 1 or an outlet 2 by left and right hand movement of a control lever and to an outlet 3 by forward movement at the same lever without interrupting the communication with either of the outlets 1 or 2.

With the system so far described, to obtain the condition of FIG. 1 with the front left steering clutch and the rear right steering clutch released, valve 28 is opened to position 1 communicating pressure to L CL and R CL. Depression of a single brake pedal as at 34 in FIG. 2 normally communicates air to both brakes on the front tractor and both brakes on the rear tractor. However, upon release of front clutch L CL and rear clutch R CL pressure is also communicated through a line 35 to a valve 36, which is closed by pressure, to interrupt communication of pressure to the right brake of the forward tractor and the left brake of the rear tractor. Consequently, upon opening of the brake pedal valve, air is communicated to and applies to only L BR on the front tractor and R BR on the rear tractor and the condition illustrated in FIG. 1 is completed.

For turning in the opposite direction, valve 28 is opened to position 2 to release R CL on the front tractor and L CL on the rear tractor. A line 38 and valve 39 are now effective to produce engagement of brakes when the brake valve is open oppositely to that described in connection with line 35 and valve 36.

We claim:

In a steering system for tandem tractors in which each tractor has right and left steering clutches and right and left steering brakes, a single control means for releasing the left clutch of the forward tractor and right clutch of the rearward tractor or selectively the right clutch of the forward tractor and left clutch of the rearward tractor, a single control means for applying all brakes, separate means operable to prevent application of the right forward and left rearward brakes while the left forward and right rearward clutches are released, and a second separate means to prevent application of the left forward and right rearward brakes while right forward and left rearward clutches are released, whereby the single control for applying brakes will apply brakes corresponding in positions to clutches which are released.

References Cited

UNITED STATES PATENTS

| | | | |
|---|---|---|---|
| 2,933,143 | 4/1960 | Robinson et al. | 180—14 |
| 3,245,488 | 4/1966 | Peterson | 180—14 |

BENJAMIN HERSH, *Primary Examiner.*

J. A. PEKAR, *Assistant Examiner.*